United States Patent
Goller et al.

(10) Patent No.: US 7,127,919 B2
(45) Date of Patent: Oct. 31, 2006

(54) METHODS AND APPARATUS FOR HOMOGENIZING MOLTEN GLASS

(75) Inventors: Martin H. Goller, Beaver Dams, NY (US); James P. Murphy, Corning, NY (US); Daniel A. Nolet, Danville, KY (US); Robert R. Thomas, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 481 days.

(21) Appl. No.: 10/302,661

(22) Filed: Nov. 22, 2002

(65) Prior Publication Data

US 2003/0101750 A1   Jun. 5, 2003

Related U.S. Application Data

(60) Provisional application No. 60/335,286, filed on Nov. 30, 2001.

(51) Int. Cl.
   *C03B 5/187* (2006.01)
(52) U.S. Cl. .................. 65/135.3; 65/178; 65/374.12; 366/270; 366/297; 366/317; 366/325.92
(58) Field of Classification Search .............. 65/135.2, 65/135.3, 135.4, 178, 374.12; 366/270, 297, 366/317, 325.92
See application file for complete search history.

(56) References Cited

U.S. PATENT DOCUMENTS

| 2,569,459 | A | | 10/1951 | DeVoe |
| 2,570,078 | A | | 10/1951 | Spremulli |
| 2,750,161 | A | * | 6/1956 | Simmons ................ 65/135.3 |
| 2,831,664 | A | | 4/1958 | Spremulli |
| 3,352,659 | A | | 11/1967 | Rahe |
| 3,951,635 | A | | 4/1976 | Rough, Sr. |
| 4,325,724 | A | | 4/1982 | Froberg |
| 4,493,557 | A | | 1/1985 | Nayak et al. |
| 5,120,342 | A | | 6/1992 | Richards |
| 5,198,156 | A | * | 3/1993 | Middleton et al. ............ 261/87 |
| 5,241,558 | A | | 8/1993 | Nagashima et al. |
| 5,246,289 | A | * | 9/1993 | Middleton et al. .......... 366/270 |
| 5,319,669 | A | | 6/1994 | Cox et al. |
| 5,399,014 | A | * | 3/1995 | Takata et al. ............... 366/262 |
| 5,849,058 | A | | 12/1998 | Takeshita et al. |
| 6,270,248 | B1 | | 8/2001 | Yoshida et al. |
| 6,463,763 | B1 | * | 10/2002 | Walser et al. ................. 65/178 |

(Continued)

FOREIGN PATENT DOCUMENTS

JP         63-008226         1/1988

(Continued)

OTHER PUBLICATIONS

Cable et al., "A quantitative study of the homogenizing of glass melts," *Chemical Engineering Science*, Feb. 1972, 27:409-415.

(Continued)

*Primary Examiner*—Sean Vincent
(74) *Attorney, Agent, or Firm*—Maurice M. Klee; Thomas R. Beall (57) ABSTRACT

The level of precious-metal inclusions in glass products, e.g., glass substrates for liquid crystal displays, is reduced by stirring molten glass in a stir chamber (11) under conditions such that the magnitude of the shear stress $\tau$ on the chamber's wall (19) and on the surfaces of the stirrer (13) is reduced while at the same time, the Q•E product for the system is kept high, where Q is the flow of glass through the stirring system and E is the system's stirring effectiveness.

25 Claims, 7 Drawing Sheets

U.S. PATENT DOCUMENTS 6,508,583 B1 * 1/2003 Shankwitz et al. ......... 366/196
6,763,684 B1 * 7/2004 Pitbladdo ................... 65/135.4
2005/0007874 A1 * 1/2005 Roszczenko et al. ....... 366/270

FOREIGN PATENT DOCUMENTS

JP 05-229831 9/1993
JP 2001-072426 3/2001

OTHER PUBLICATIONS

Parker, N. H., "Liquid Mixing," *Chemical Engineering*, Jun. 1964, p. 166-202.

Spencer et al., "The Mixing of Very Viscous Liquids," *J. Coll. Science*, 1951, 6:133-145.

* cited by examiner

METHODS AND APPARATUS FOR HOMOGENIZING MOLTEN GLASS

FIELD OF THE INVENTION

This invention relates to the homogenization of molten glass and, in particular, to the homogenization of molten glass which will be used to produce high quality finished products having low levels of defects. A particularly important application of the invention is in the manufacture of glass substrates for liquid crystal displays, such as the substrates used in the production of AMLCDs.

BACKGROUND OF THE INVENTION

Chemical and thermal homogeneity in glass is a crucial part of good forming operations. The function of a glass melter is generally to produce glass with acceptable levels of gaseous or solid inclusions, but this glass usually has cord (or striae or ream) of chemically dissimilar phases. These non-homogeneous components of the parent glass result from a variety of normal occurrences during the melting process including refractory dissolution, melting stratification, glass surface volatilization, and temperature differences. The resulting cords are visible in the parent glass because of color and/or index differences.

One approach for improving the homogeneity of glass is to pass the molten glass through a vertically-oriented stir chamber located downstream of the melter. Such stir chambers are equipped with a stirrer having a central shaft which is rotated by a suitable motor. A plurality of blades extend from the shaft and serve to mix the molten glass as it passes from the top to the bottom of the stir chamber. The present invention is concerned with the operation of such stir chambers and, in particular, with achieving high throughput and high mixing efficiency (mixing effectiveness) from such a chamber without introducing defects into the resulting glass, specifically, defects arising from the erosion of the wall of the stir chamber and/or the surfaces of the stirrer as a result of the mixing process.

A simple way of picturing what a stirrer does under laminar flow conditions is to think of the cord as lumps of off-composition glass surrounded by glass of desired, or parent, composition. Each piece of cord can be thought of as having an interface between it and the parent glass. A measure of the total inhomogeneity of the glass is the total interfacial surface area of the cord. The minimum interfacial surface area occurs when all of the cord is in one spherical lump. As the lumps are broken into smaller parts and are stretched out into flat planes, the interfacial surface area is increased despite the fact that the volume of cord remains the same. A measure of the efficiency of stirring (also referred to herein as the effectiveness of stirring) is the ratio of the increased interfacial area after stirring to that before stirring.

To be effective in increasing homogeneity, a stirring system should perform the following three functions:

(1) It should stretch the individual lumps of inhomogeneous glass into thin streaks. This function requires the application of shear stress to the glass.

(2) It should cut the streaks into short segments. This function can be achieved through flow of the molten glass in a direction normal to the plane of the stirrer's blades.

(3) It should disperse the short segments such that there is no recognizable pattern. This function can be achieved through the selection of blade shapes that push glass normal to the direction of bulk flow, i.e., blade shapes that produce at least some radial flow of the glass.

Making the streaks thin and cutting them makes them individually difficult to see on a microscopic scale. Dispersing them eliminates the possibility that a visible pattern will be left on a macroscopic scale.

In a process where the flow of glass is continuous, these three functions must take place in a discrete time interval determined by the residence time of the glass in the stir chamber. As the flow rate of glass is increased, the glass has less time in the chamber for these three functions to take place. The usual engineering response to a desired increase in flow is an increase in stirrer speed. This increases the shear stress, the cutting frequency, and potentially also the dispersion rate.

Traditionally, glass stirring systems have been designed to have the highest shear stress possible consistent with reasonable stirrer life. Indeed, such systems are normally designed to produce high shear stress even when operated at low speeds. The intent is to get the most stirring from the smallest stirring system because of the high cost of the precious metals (e.g., platinum alloys) from which the stirring system is fabricated. In general terms, shear stress is increased by increasing blade speed and/or reducing the clearance between the stirrer's blades and the wall of the stir chamber.

For many glass products (e.g., architectural glass), only moderate homogeneity requirements apply. However, other glass products must meet stringent homogeneity and other quality standards. LCD glass is in this latter category. For this glass, both cord and inclusions need to be minimized and/or eliminated.

In accordance with the invention, it was discovered that in the process of making LCD glass, precious metal inclusions (e.g., platinum alloy inclusions) having a size less than 50 microns were being introduced into the LCD glass during its manufacture. These inclusions were traced to the stir chamber and, in particular, to erosion of the stirrer and the stir chamber wall as a result of viscous shear stresses created by the motion of the stirrer through the viscous molten glass.

One of the objects of the present invention is thus to minimize the creation of precious metal inclusions during the stirring of molten glass. However, this primary object is supplemented by the objects of: (1) maintaining high glass throughput, and (2) maintaining high stirring efficiency (e.g., low levels of cord). These latter objects and the primary object pull in opposite directions, e.g., one can reduce stirrer speed to reduce sheer stress and thus erosion, but reduced stirrer speed means less efficient stirring and/or reduced throughput.

As discussed below, the present invention is able to simultaneously achieve these seemingly contradictory goals by means of relationships between stirrer speed, stirrer/stir chamber geometry, and glass viscosity which allow sheer stress to be reduced below the level where unacceptable levels of inclusions are formed (e.g., the sheer stress acting on the stirrer and the stir chamber wall can be made less than $3.5 \times 10^{-3}$ N/m$^2$) while at the same time stirring efficiency and throughput are maintained at levels previously only achieved with high sheer stirring.

SUMMARY OF THE INVENTION

In accordance with one of its aspects, the invention provides a method for homogenizing molten glass comprising:

(a) providing a cylindrically-shaped, substantially vertically-oriented stir chamber which comprises a wall having an internal diameter $D_{wall}$;

(b) providing a stirrer within the stir chamber, said stirrer comprising a substantially vertically-oriented shaft and a plurality of blades which extend outward from the shaft towards the wall of the stir chamber, the maximum diameter of the blades being $D_{blade}$;

(c) flowing molten glass through the stir chamber (e.g., at a rate of at least 0.05 kilograms/second), said molten glass having a viscosity µ; and (d) applying a torque T to the shaft of the stirrer to rotate the stirrer within the stir chamber at a speed N as the molten glass flows through the chamber, said rotation of the stirrer within the chamber defining a swept volume V;

wherein N, T, V, $D_{wall}$, $D_{blade}$, and µ are selected to satisfy the relationships:

$(NTV/\mu)^{0.5} \geq 5.0$ kilograms/second, and $(2\pi\mu ND_{blade})/(D_{wall}-D_{blade}) \leq 3.5\times 10^{-3}$ newtons/meter$^2$, where N is in radians per second, T is in newton-meters, V is in meters$^3$, $D_{wall}$ is in meters, $D_{blade}$ is in meters, and µ is in kg/meter-second.

In accordance with a second aspect, the invention provides apparatus for practicing the above method.

In accordance with a third aspect, the invention provides apparatus for homogenizing molten glass comprising:

(a) a cylindrically-shaped, substantially vertically-oriented stir chamber which comprises a wall; and (b) a stirrer within the stir chamber, said stirrer comprising a substantially vertically-oriented shaft and a plurality of blades which extend outward from the shaft towards the wall of the stir chamber;

wherein the stir chamber comprises a side exit port such that glass exiting the stir chamber undergoes a change in flow direction and the stirrer comprises at least one member for stirring the glass in the region of the change in flow direction, said at least one member having a longitudinal axis that is substantially parallel to, but not collinear with, the stirrer's shaft.

Preferably, the third aspect of the invention is used with the first and/or second aspects of the invention.

A preferred application for each of the above three aspects of the invention is in the manufacture of liquid crystal display glass. When used in this application, the number of precious metal inclusions (e.g., platinum-containing inclusions) of a size greater than 10 microns is preferably less than 20 per kilogram of finished glass.

The foregoing drawings, which are incorporated in and constitute part of the specification, illustrate various embodiments of the invention, and together with the description, serve to explain the principles of the invention. It is to be understood, of course, that both the drawings and the description are explanatory only and are not restrictive of the invention.

The reference numbers used in the drawings correspond to the following:

11 stir chamber
13 stirrer
15 stirrer blade
17 stirrer shaft
19 stirrer wall
21 entrance port
23 exit port
25 stirring member (finger)
27 optional sump
29 motor
31 drain tube
33 flow direction indicators including flow arrows, flow contours, and flow tubes

DETAILED DESCRIPTION OF THE INVENTION

As discussed above, prior to the present invention, the philosophy underlying stirrer/stir chamber design was to generate high levels of shear stress so as to achieve high levels of stirring effectiveness. Shear stress is created near the wall 19 of a stir chamber 11 by close-clearance between the stirrer blades 15 and the wall and by blade speed. In general terms, the shear stress τ acting on the surfaces of the stirrer and the inner surface of the stir chamber wall can be expressed as:

$$|\tau|=\mu dv/dx \tag{1}$$

where µ is the viscosity of the molten glass, v is fluid velocity, and x is in a direction normal to the surface which experiences the shear stress.

Figure 1:
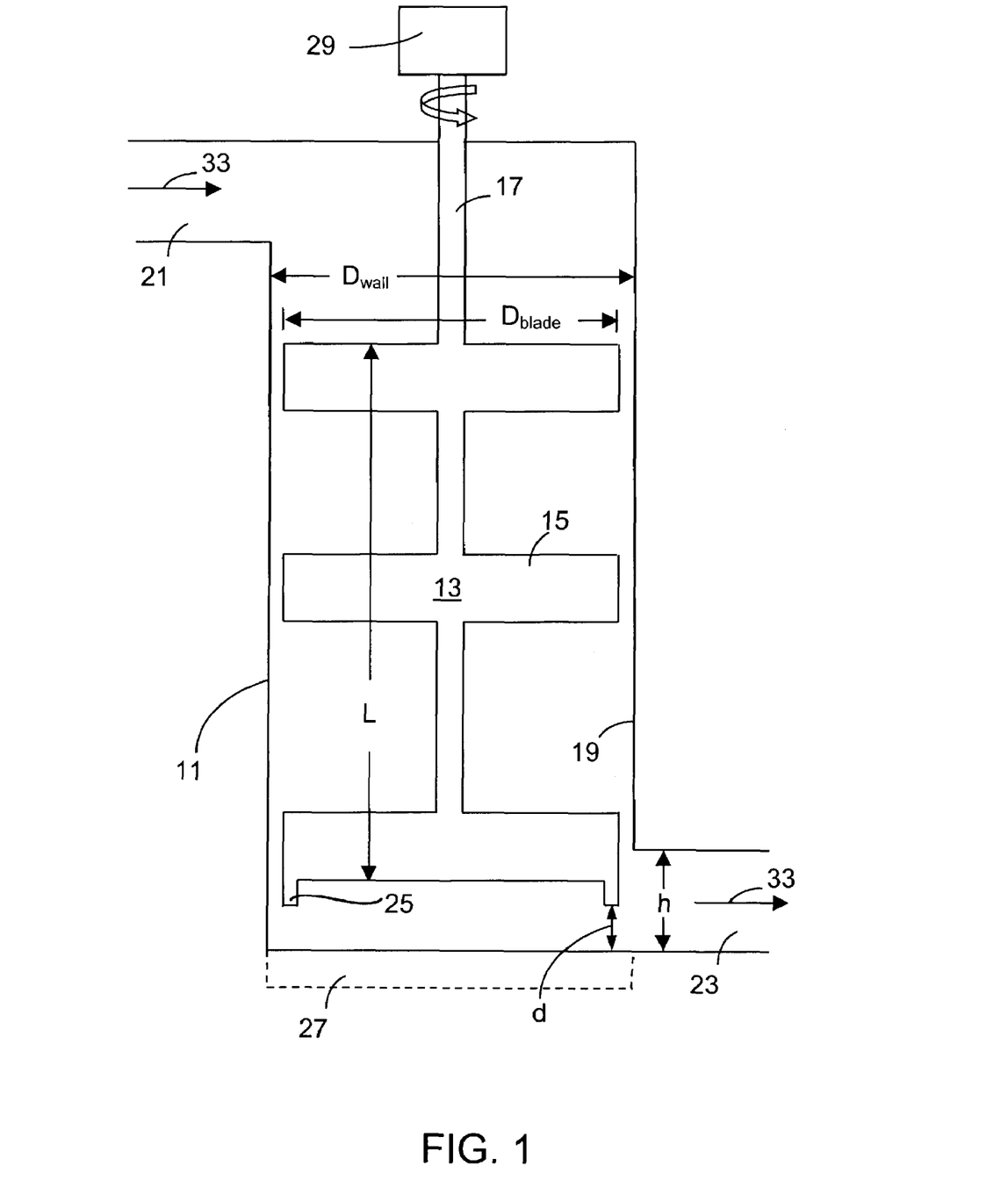
FIG. 1 is a schematic diagram illustrating various of the stirrer/stir chamber dimensions discussed herein.

Applying equation (1) to a cylindrically-shaped stir chamber and a circularly symmetric stirrer having one or more blades of a common diameter $D_{blade}$ one obtains:

$$|\tau|=\mu\pi ND_{blade}/C \tag{2}$$

where N is the stirrer speed in radians/second and C is the coupling distance between the blade tip and the stir chamber wall (i.e., in FIG. 1, $C=(D_{wall}-D_{blade})/2$). For µ in kilograms/meter-second, N in radians/second, and $D_{blade}$ and C in meters, τ is in newtons/meters squared (N/m$^2$).

As discussed above and more fully illustrated by the examples presented below, in accordance with the invention, it has been discovered that |τ| needs to be kept below $3.5\times 10^{-3}$ N/m$^2$ and preferably below $1.5\times 10^{-3}$ to avoid levels of erosion of the stirrer and the stirrer wall which produce levels of inclusions (e.g., inclusions having a size greater than 10 microns) which are unacceptably high (e.g., levels of inclusions which are greater than, for example, 20 per kilogram of finished glass).

From equation (2), it can be seen that shear stress levels can be reduced by reducing N and/or reducing $D_{blade}$ and/or increasing C. However, simply reducing shear stress is not commercially acceptable since in the end, stirring must produce suitably homogenized glass at practical flow rates. Accordingly, for a practical system, reductions in shear stress should not be at the expense of stirring effectiveness or flow rate.

By means of physical modeling, specifically, oil-modeling, of a variety of stirring systems, the following equation was developed for stirring effectiveness E (a dimensionless quantity):

$$E \approx (kBD_{blade}^2 NV\tau/Q^2\mu)^{0.5} \quad (3)$$

where k is a constant which depends on stirrer/stir chamber geometry, Q is flow rate, B is the number of blade tips, and V is the swept volume of the stirrer. In particular, laboratory experiments were performed employing a variety of full scale stirring systems filled with a non-flowing, viscous oil whose viscosity was chosen to be that of the glass whose stirring behavior was to be studied. Viscous oils having different viscosities were employed to represent different glasses or the same glass being stirred at different temperatures. The quantity E obtained through this work can be thought of as the ratio of cord level entering the stirring process to the cord level exiting the process, i.e., higher values of E represent less cord at the end of the stirring process.

As illustrated in FIG. 1, V in equation (3) can be calculated as $V=\pi(D_{blade}/2)^2 L$, where L is the overall length of the stirrer from the top of its uppermost blade to the bottom of its lowermost blade. As shown in FIG. 1, L does not include the length of any members 25 which may extend below the lowermost blade and which serve to reduce cord in the finished glass resulting from a change in direction of the molten glass in the region of exit port 23 (see below). The swept volume V will normally be less than the overall volume of the stir chamber which, as shown in FIG. 1, extends from entrance port 21 to exit port 23. As also shown in this figure, the swept volume can overlap with a portion of the exit port. Similarly, although not shown in FIG. 1, the swept volume can overlap with a portion of the entrance port. When such overlapping occurs, the stirrer's blades will be coupled with the stir chamber wall through only a portion of each rotation in the area of the overlap.

From equation (3), it can be seen that to reduce |τ| while keeping E substantially the same (or increasing it), one can: (1) reduce viscosity, (2) increase swept volume, and/or (3) use a larger stirrer. In this equation, this can take the form of offsetting a decrease in N and |τ| with an increase in V and D. |τ| is decreased when viscosity and speed are decreased. When diameter is increased, V is also increased, so the strong benefit of increased stirrer diameter offsets the reduction in shear stress.

Looked at another way, for a given flow rate (Q), keeping stirring effectiveness constant with reduced shear stress will in general require an increase in stirrer diameter (D) or stirred volume (V). These two variables are related since an increase in D for a constant L results in an increase in V. Therefore, in accordance with the invention, one moves away from the concept of a small stirring system with high shear stress to a concept where shear stress is reduced with a larger system that maintains stirring effectiveness. In effect, this means that the residence time is increased so that there is time to do the amount of work on the glass that is necessary to produce good homogeneity even though the stirrer is going slower. Attempts to achieve reduced shear stress in smaller systems fail because E is also reduced when N is reduced.

Even more useful than E in characterizing a commercial glass stirring system is the product of flow rate times stirring effectiveness (Q•E), which from equation (3) is given by:

$$Q \cdot E \approx (kBD_{blade}^2 NV\tau/\mu)^{0.5} \quad (4)$$

In addition to the above expression for stirring efficiency, the physical modeling (oil-modeling) also revealed the following relationship for the torque T that needs to be applied to a stirrer shaft to rotate it at a speed N during stirring:

$$T = P/N \approx \pi\mu k N B D_{blade}^3 / C \quad (5)$$

where P is the power applied to the stirrer.

This equation allows the constant k, which depends on the stirrer/stir chamber geometry, to be eliminated from equations (3) and (4):

$$E \approx (CTV\tau/(\tau Q^2 \mu^2 D_{blade}))^{0.5} \quad (6)$$

$$Q \cdot E \approx (CTV\tau/(\tau \mu^2 D_{blade}))^{0.5} \quad (7)$$

Substituting equation (1) further simplifies these equations to:

$$E \approx (NTV/Q^2 \mu)^{0.5} \quad (8)$$

$$Q \cdot E \approx (NTV/\mu)^{0.5} \quad (9)$$

These equations have the advantage that E and Q•E are only functions of torque, system dimensions, stirrer speed, flow rate and viscosity, all of which are readily measured using conventional techniques. In particular, torque can be measured with a calibrated direct-drive electric motor having a built-in torque measuring system or with a torque transducer (e.g., a strain gage) attached to, for example, the coupler between the stirrer's shaft 17 and the stirring system's drive motor 29. Such a torque measurement can be made either during an actual glass manufacturing process or using a physical model (e.g., an oil-model) of the process. Most importantly, equations (8) and (9) do not depend on the specific geometry of the stirrer used and thus these equations are generally applicable to stirrer systems having a variety of geometries.

In practice, E is preferably greater than 80, more preferably greater than 100, and most preferably greater than 120, while the Q•E product is preferably greater than 5.0 kilograms/second, more preferably greater than 7.5 kilograms/second, and most preferably greater than 10.0 kilograms/second. In achieving these values, T needs to be kept below a value where the stirrer's shaft will exhibit substantial creep as a result of torsional stress at the operating temperatures employed (e.g., operating temperatures between ~1350° C. and ~1500° C.). For a solid shaft of diameter $D_{shaft}$, the torsional stress σ is given by:

$$\sigma = 16T/\pi D_{shaft}^3, \quad (10)$$

while for a hollow shaft having an inside diameter $D_i$ and an outside diameter $D_o$, it is given by:

$$\sigma = 16TD_o/(\pi(D_o^4 - D_i^4)), \quad (11)$$

where in both cases, σ is in pascals, T is in newton-meters, and $D_{shaft}$, $D_o$, and $D_i$ are each in meters. For a stirrer made of platinum or a platinum alloy, T is preferably less than 75 newton-meters.

The above equations for |τ|, E, Q•E, and T assume that stirring is taking place under laminar flow conditions. Such conditions exist when the mixing Reynolds number ($Re_N$) is less than 10, where $Re_N$ is given by:

$$Re_N = D_{blade}^2 N\rho/\mu, \quad (12)$$

and ρ is the density of the glass (kg/m³). As a rule of thumb, laminar flow can be assumed when the glass viscosity is greater than 500 poise.

Figure 2:
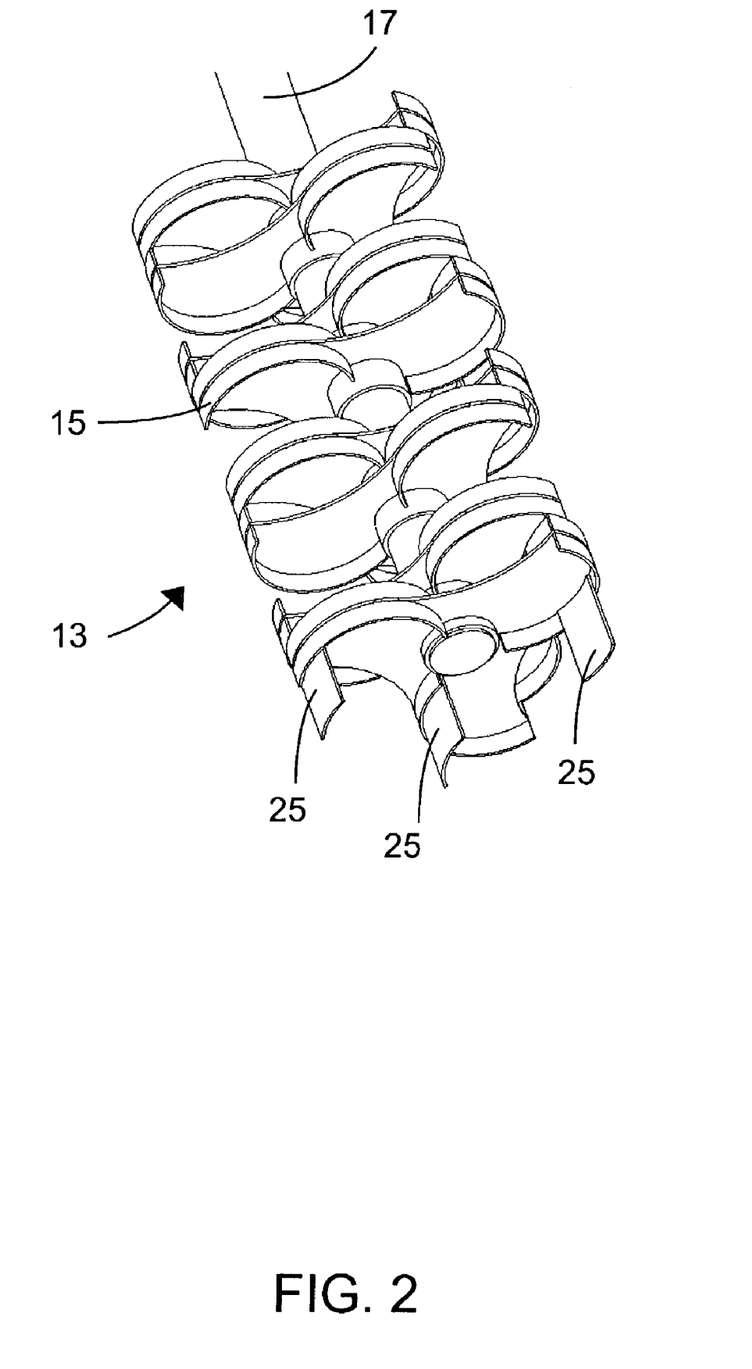
FIG. 2 is a perspective view of a stirrer which can be used in the practice of the invention.

FIGS. 2–5 show one example of the types of stirrer systems with which the present invention can be used. As shown in FIG. 2, the stirrer can be of the general type disclosed in commonly-assigned U.S. Pat. No. 2,569,459 to C. F. De Voe, the contents of which are hereby incorporated by reference. Other stirrer designs can, of course, be used in the practice of the invention. The stirrer preferably does not significantly pump the glass through the stir chamber since to produce a pumping effect generally requires unacceptably high levels of shear stress. The stirrer and the stir chamber wall are preferably composed of platinum, a platinum alloy or a dispersion strengthened platinum or platinum alloy (e.g., a zirconia strengthened platinum alloy).

As shown in the figures, stirrer 13 is preferably equipped with members (fingers) 25 which have a longitudinal axis (long dimension) that is substantially parallel to, but not collinear with, the stirrer's shaft 17. The number of members 25 used can vary between, for example, 1 and 7, and depending on the particular system, their length can be between, for example, 1 and 4 inches. In practice, three members each having a working length of ~2.2 inches have been found to work successfully for an exit port whose height is 6 inches. For comparison, the height of stirring blades 15 can be 2.5 inches.

The members preferably extend below the bottom of shaft 17 and preferably are composed of the same material as the stirrer's blades and shaft. All of the members preferably have the same height, although members having different heights can be used if desired. The circumferential width of the members can vary depending on location relative to the stirrer's shaft 17, e.g., for the stirrer of FIG. 2, the width of the member closest to the shaft can be 2.0 inches, while those at the outer periphery of the stirrer can have a width of 1.5 inches.

Members 25 serve to minimize increases in cord levels which have been found to result from (1) the slower rotational speed used in the stirring systems of the invention (e.g., rotational speeds between 3 and 15 rpm) and (2) the change in direction of flow which occurs as the glass enters exit port 23 from the main body of the stir chamber (e.g., a change in direction of 90°). Members 25 are distinguished from the blades 15 of the stirrer in that the members do not create substantial radial flow of the glass passing through the stir chamber while the blades do create such flow.

Figure 3:
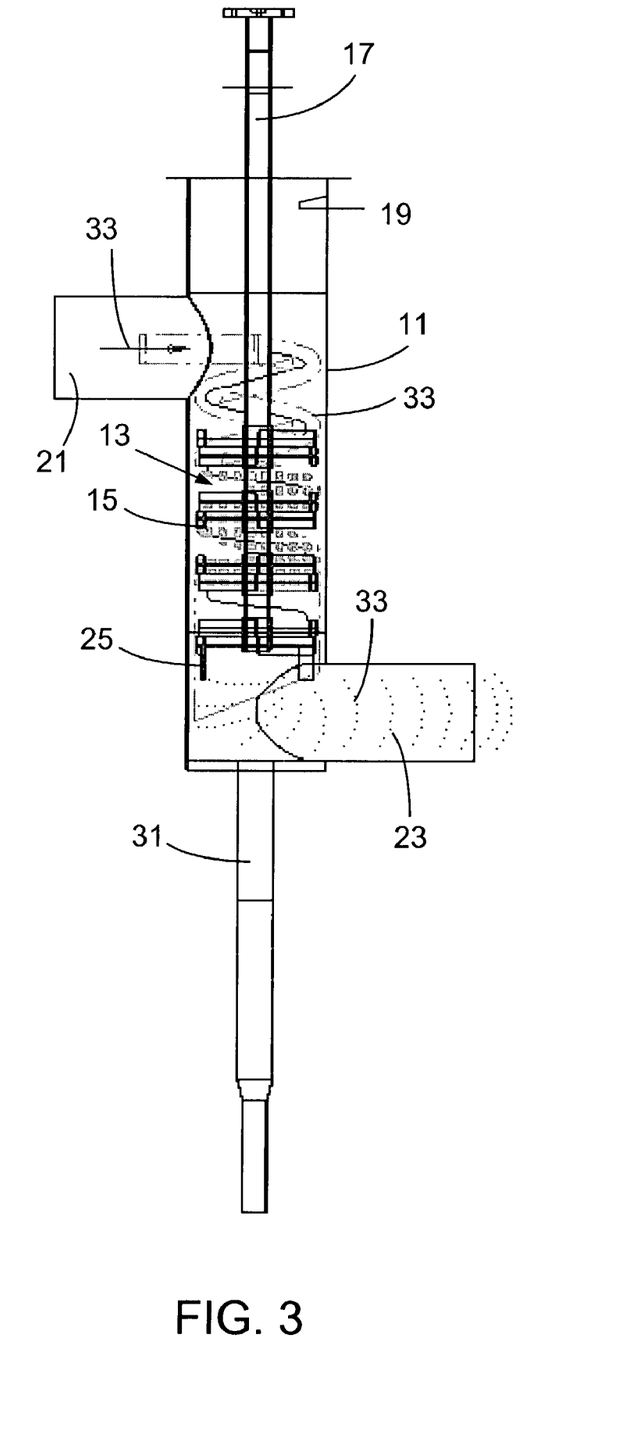
FIG. 3 is a side view, partially in section, showing the stirrer of FIG. 2 installed in a stir chamber of the type which can be used in the practice of the invention.
Figure 4:
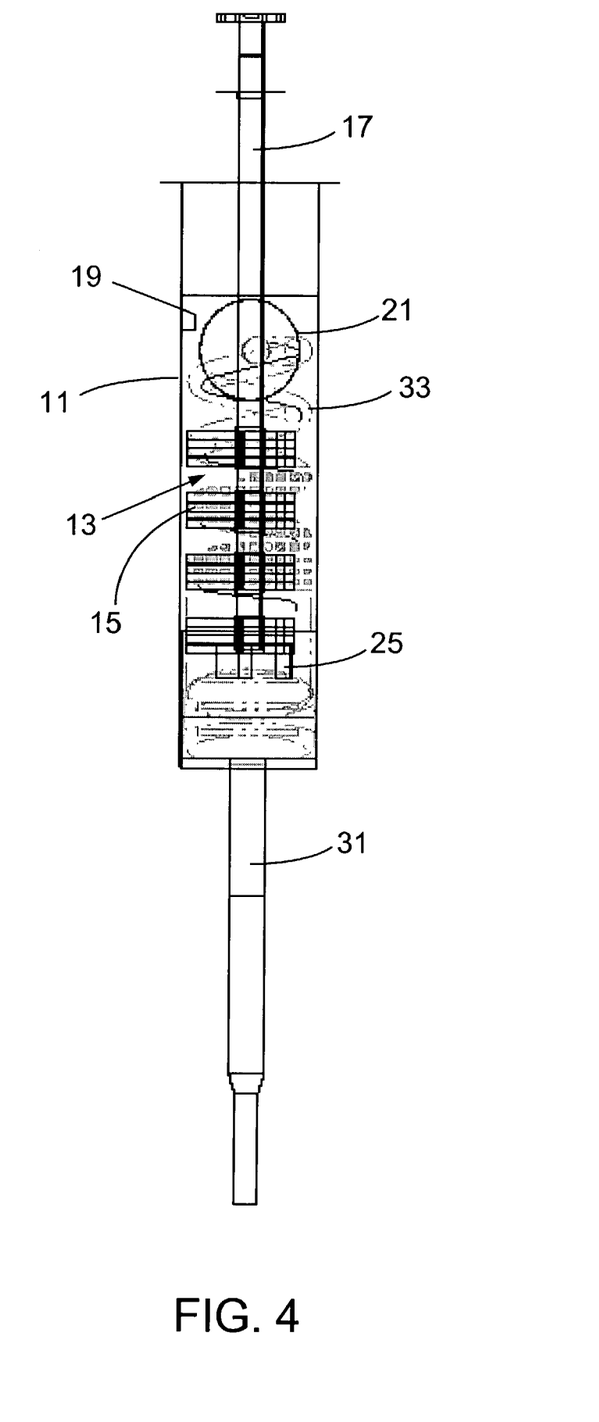
FIG. 4 is a front view, partially in section, of the stirrer/stir chamber combination of FIG. 3.
Figure 5:
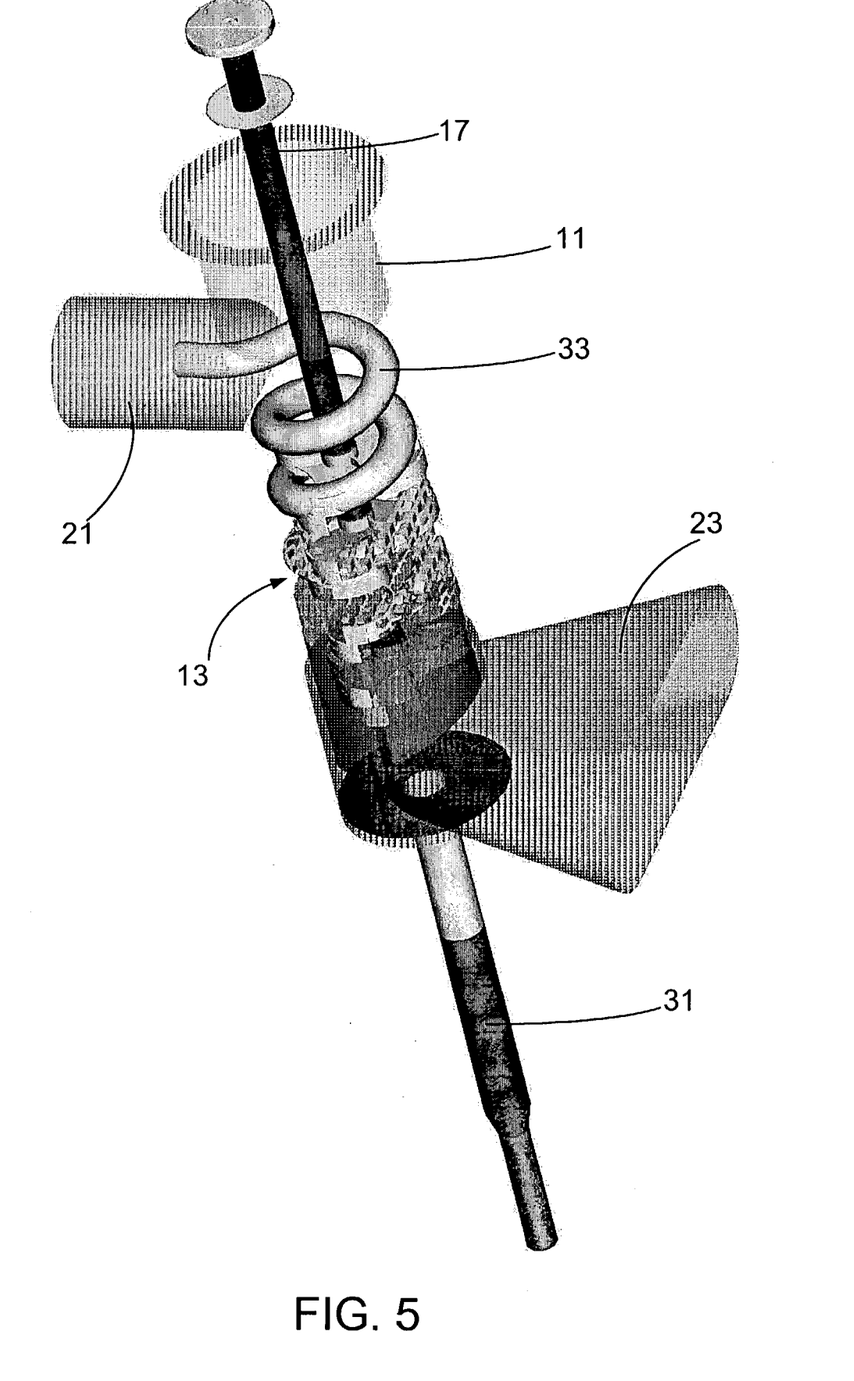
FIG. 5 is a schematic drawing illustrating in stylized form the flow of molten glass through the stir chamber of FIGS. 3 and 4.

As shown in FIGS. 3–5, stir chamber 11 can include a drain tube 31 for removing glass from the stir chamber during, for example, shut down of the system. In addition (or alternatively), the stir chamber can include a sump 27 as shown by dotted lines in FIG. 1.

In practice, it has been found that members 25 preferably should extend below the top of exit port 23 but should not reach all the way to the bottom of the stir chamber. In particular, the ratio of the distance d between the bottom end of member 25 and the bottom of the stir chamber (which is the top of the sump in those cases where a sump is used, i.e., the bottom of the chamber is functionally the top of the sump) is preferably in the range:

$$0.2h \leq d \leq 0.7h \text{ (e.g., } d \approx 0.4h\text{)}, \tag{13}$$

where h is the height of the exit port (see FIG. 1). When in this range, members 25 effectively cut through the molten glass' flow pattern in the region of the stir chamber's exit port (see flow contours 33 of FIGS. 3–4). By this cutting action, the level of cord in the finished glass is reduced without an increase in the level of inclusions in the glass.

Without intending to limit it in any manner, the present invention will be more fully described by the following examples.

EXAMPLE 1

As an example of the application of the concepts discussed above, Table 1 compares two stirring systems, the first being representative of previously used stirring systems (e.g., a stirring system having a blade diameter of 6 inches, a glass viscosity of 3000 poise, and a stirrer rotational speed of 30 rpm), and the second one being representative of a stirring system designed in accordance with the invention (e.g., a stirring system having a diameter of 10 inches, a glass viscosity of 1000 poise (achieved by increasing the temperature of the molten glass by, for example, approximately 80° C.), and a stirrer rotational speed of 6.3 rpm).

As can be seen in this table, the shear stress on the stirrer can be reduced almost by an order of magnitude by increasing the stirrer diameter from 6" to 10" and reducing the stirred glass viscosity from 3000 to 1000 poise. These changes allow a stirrer speed reduction by a factor of four. A useful byproduct is that the torsional stress on the shaft is also reduced, roughly by 25%, which helps extend stirrer life.

EXAMPLE 2

Figure 6:
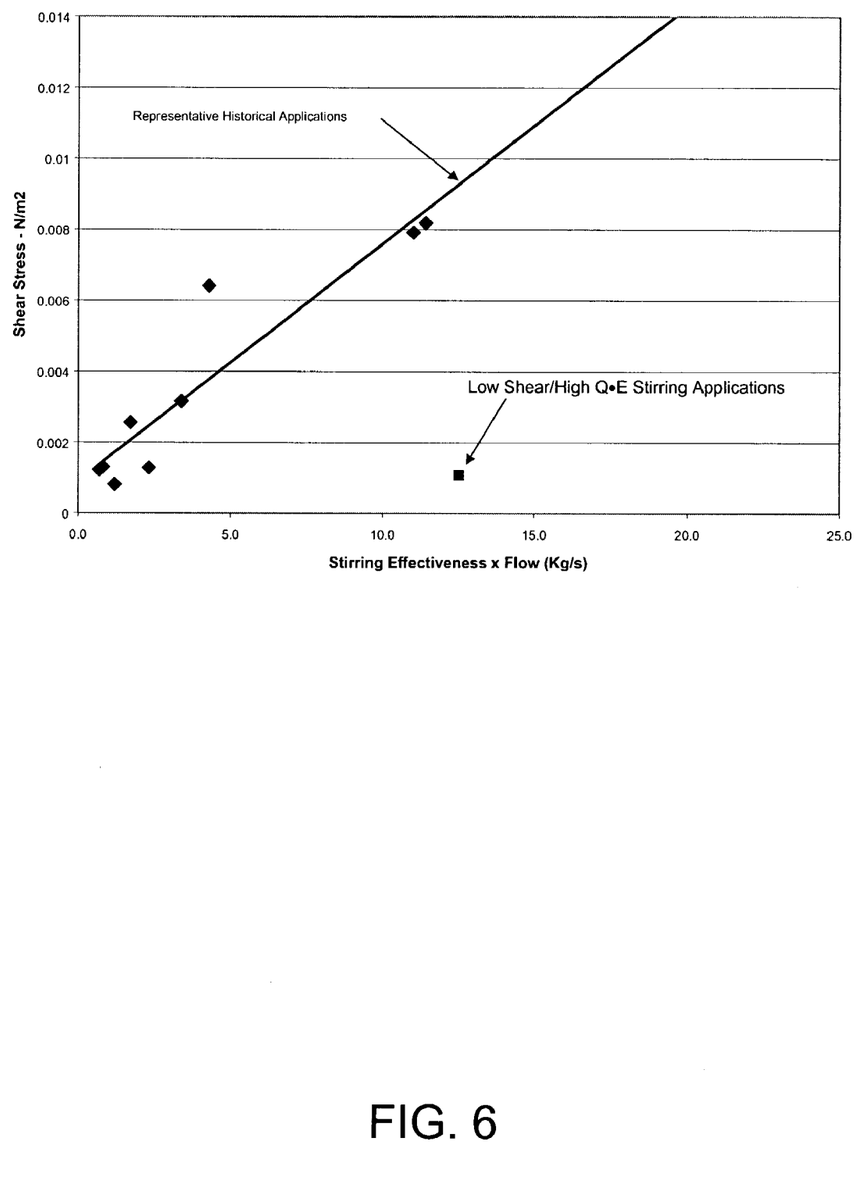
FIG. 6 is a plot of shear stress versus the product of glass flow times stirring effectiveness.
Figure 7:
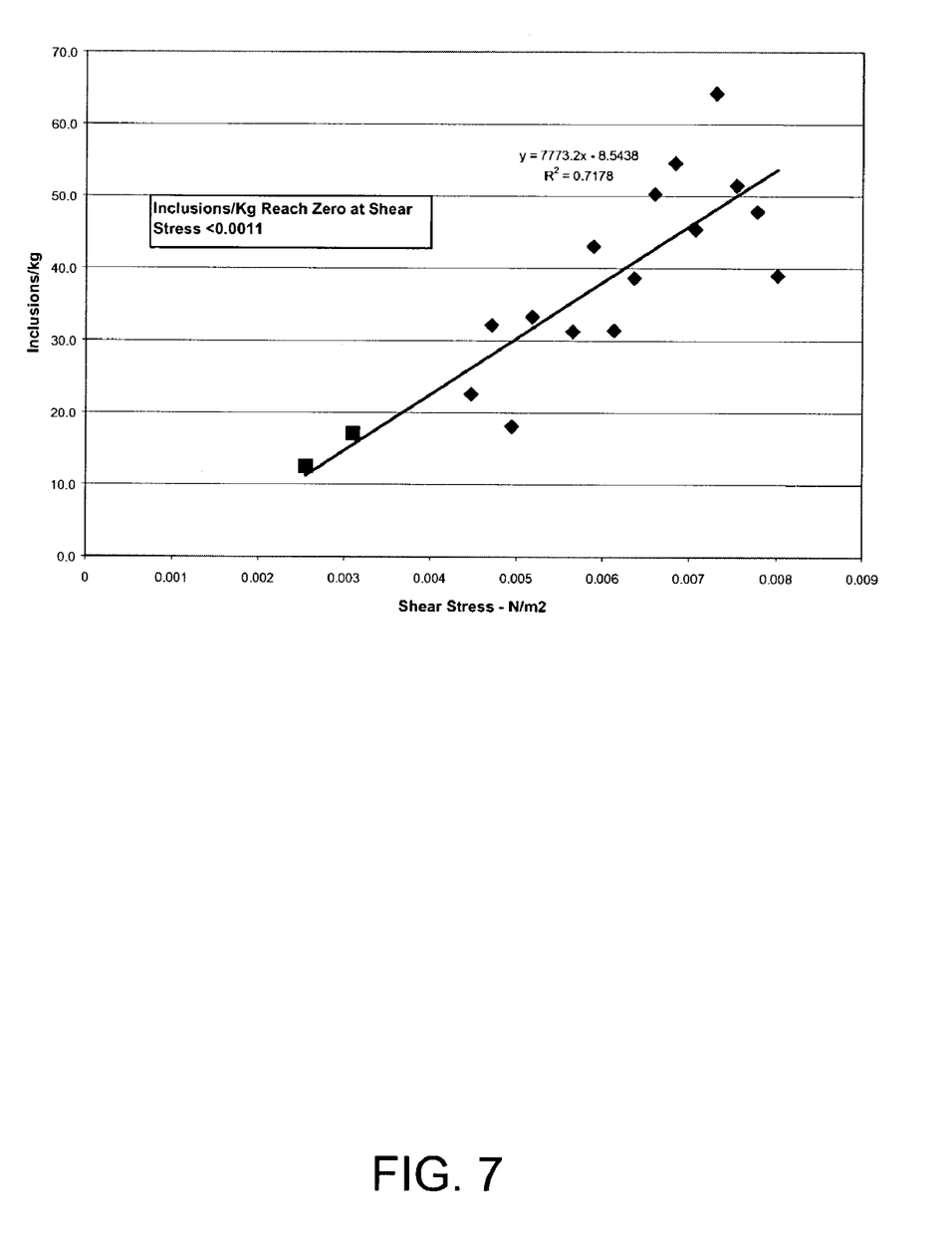
FIG. 7 is a plot of inclusions per kilogram in the finished glass versus calculated shear stress on the stirrer and stir chamber wall. In both these figures, diamond data points represent historical glass stirring systems and square data points represent systems employing the present invention.

FIGS. 6 and 7 show comparisons between historical stirring (diamond data points) and stirring performed in accordance with the present invention (square data points). The data was obtained using actual production equipment. In all cases, stirring was performed using a substantially vertically-oriented stir chamber and a substantially non-pumping stirrer having a substantially vertically-oriented shaft.

The straight line of FIG. 6, which is a fit to the historical data, shows that prior to the present invention, high Q•E products were only achieved through the use of high levels of shear stress. Conversely, low levels of shear stress were only achieved with low Q•E products. In contrast, stirring in accordance with the concepts of the present invention simultaneously achieves low shear stress and high Q•E products.

The importance of low shear stress in the production of LCD glass is illustrated in FIG. 7. As shown therein, in accordance with the invention, the level of inclusions (specifically, precious metal inclusions having a size greater than 10 microns) is a linear function of shear stress, where shear stress is calculated using equation (2). As the straight line fit of FIG. 7 shows, the inclusion/kilogram value reaches zero when the shear stress is less than $1.1 \times 10^{-3}$ N/m². The data of FIG. 7 was obtained using equipment whose resolution is limited to inclusions having a size greater than 10 microns. It is believed that the invention also reduces the level of inclusions whose size is less than 10 microns.

Although specific embodiments of the invention have been described and illustrated, it is to be understood that modifications can be made without departing from the invention's spirit and scope as defined by the following claims.

TABLE 1

| Stirrer | 6" | 10" |
|---|---|---|
| Diameter (D—inches) | 6 | 10 |
| Number of Blades (B) | 24 | 24 |
| Glass Viscosity (μ—poise) | 3000 | 1000 |
| Stirrer Rotational Speed (N—rpm) | 30 | 6.3 |
| Stirring Effectiveness (E) | 125 | 125 |
| Shear Stress (τ—psi) | 1.148 | 0.142 |

What is claimed is:

1. A method for homogenizing molten glass comprising:
   (a) providing a cylindrically-shaped, substantially vertically-oriented stir chamber which comprises a wall having an internal diameter $D_{wall}$;
   (b) providing a stirrer within the stir chamber, said stirrer comprising a substantially vertically-oriented shaft and a plurality of blades which extend outward from the shaft towards the wall of the stir chamber, the maximum diameter of the blades being $D_{blade}$;
   (c) flowing molten glass through the stir chamber, said molten glass having a viscosity μ; and
   (d) applying a torque T to the shaft of the stirrer to rotate the stirrer within the stir chamber at a speed N as the molten glass flows through the chamber, said rotation of the stirrer within the chamber defining a swept volume V;
   wherein N, T, V, $D_{wall}$, $D_{blade}$, and μ are selected to satisfy the relationships:
   Relationship I: $(NTV/\mu)^{0.5} \geq 5.0$ kilograms/second, and
   Relationship II: $(2\pi\mu ND_{blade})/(D_{wall}-D_{blade}) \leq 3.5 \times 10^{-3}$ newtons/meter²,
   where N is in radians per second, T is in newton-meters, V is in meters³, $D_{wall}$ is in meters, $D_{blade}$ is in meters, and μ is in kg/meter-second, and where Relationship I is a measure of stirring effectiveness and glass flow rate, and Relationship II is a measure of sheer stress acting on the stirrer and the stir chamber wall.

2. The method of claim 1 wherein:
   $(NTV/\mu)^{0.5} \geq 10.0$ kilograms/second.

3. The method of claim 1 wherein:
   $(2\pi\mu ND_{blade})/(D_{wall}-D_{blade}) \leq 1.5 \times 10^{-3}$ newtons/meter².

4. The method of claim 1 wherein T is less than or equal to 75 newton-meters.

5. The method of claim 1 wherein the molten glass flows through the stir chamber at a rate of at least 0.05 kilograms/second.

6. The method of claim 1 wherein the stirrer and the stir chamber wall each comprise platinum or a platinum alloy.

7. The method of claim 6 wherein the glass is liquid crystal display glass and the number of platinum-containing inclusions of a size greater than 10 microns is less than 20 per kilogram of finished glass.

8. The method of claim 1 wherein glass exiting the stir chamber undergoes a change in flow direction and the stirrer comprises at least one member for stirring the glass in the region of the change in flow direction, said at least one member having a longitudinal axis that is substantially parallel to, but not collinear with, the stirrer's shaft.

9. The method of claim 8 wherein the at least one member extends below the bottom of the stirrer's shaft.

10. The method of claim 8 wherein:
    (i) the stir chamber has a bottom and a side exit port in the region of the bottom, said exit port having a vertical height h, and
    (ii) said at least one member has a bottom end which is spaced from the bottom of the stir chamber by a distance d,
    where d satisfies the relationship:
    $$2.0h \leq d \leq 0.7h.$$

11. The method of claim 10 wherein $d \approx 0.4h$.

12. Apparatus for homogenizing flowing molten glass which has a viscosity μ, said apparatus comprising:
    (a) a cylindrically-shaped, substantially vertically-oriented stir chamber which comprises a wall having an internal diameter $D_{wall}$;
    (b) a stirrer within the stir chamber, said stirrer comprising a substantially vertically-oriented shaft and a plurality of blades which extend outward from the shaft towards the wall of the stir chamber, the maximum diameter of the blades being $D_{blade}$; and
    (c) a motor which applies a torque T to the shaft of the stirrer to rotate the stirrer within the stir chamber at a speed N as molten glass flows through the chamber, said rotation of the stirrer within the chamber defining a swept volume V;
    wherein N, T, V, $D_{wall}$, $D_{blade}$, and μ satisfy the relationships:
    Relationship I: $(NTV/\mu)^{0.5} \geq 5.0$ kilograms/second, and
    Relationship II: $(2\pi\mu ND_{blade})/(D_{wall}-D_{blade}) \leq 3.5 \times 10^{-3}$ newtons/meter²,
    where N is in radians per second, T is in newton-meters, V is in meters³, $D_{wall}$ is in meters, $D_{blade}$ is in meters, and μ is in kilograms/meter-second, and where Relationship I is a measure of stirring effectiveness and glass flow rate, and Relationship II is a measure of sheer stress acting on the stirrer and the stir chamber wall.

13. The apparatus of claim 12 wherein:
    $(NTV/\mu)^{0.5} \geq 10.0$ kilograms/second.

14. The apparatus of claim 12 wherein:
    $(2\pi\mu ND_{blade})/(D_{wall}-D_{blade}) \leq 1.5 \times 10^{-3}$ newtons/meter².

15. The apparatus of claim 12 wherein the motor applies a torque to the shaft that is less than or equal to 75 newton-meters.

16. The apparatus of claim 12 wherein the stirrer and the stir chamber wall each comprise platinum or a platinum alloy.

17. The apparatus of claim 12 wherein the stir chamber comprises a side exit port such that glass exiting the stir chamber undergoes a change in flow direction and the stirrer comprises at least one member for stirring the glass in the region of the change in flow direction, said at least one member having a longitudinal axis that is substantially parallel to, but not collinear with, the stirrer's shaft.

18. The apparatus of claim 17 wherein the at least one member extends below the bottom of the stirrer's shaft.

19. The apparatus of claim 17 wherein:
    (i) the stir chamber has a bottom,
    (ii) the side exit port is in the region of the bottom and has a vertical height h, and
    (iii) said at least one member has a bottom end which is spaced from the bottom of the stir chamber by a distance d,
    where d satisfies the relationship:
    $$0.2h \leq d \leq 0.7h.$$

20. The apparatus of claim 19 wherein $d \approx 0.4h$.

21. Apparatus for homogenizing molten glass comprising:
    (a) a cylindrically-shaped, substantially vertically-oriented stir chamber which comprises a wall; and (b) a stirrer within the stir chamber, said stirrer comprising a substantially vertically-oriented shaft and a plurality of blades which extend outward from the shaft towards the wall of the stir chamber and create substantial radial flow of the glass passing through the stir chamber;

wherein:

(i) the stir chamber comprises a side exit port such that glass exiting the stir chamber undergoes a change in flow direction;

(ii) the stirrer comprises at least one member for stirring the glass in the region of the change in flow direction, said at least one member having a longitudinal axis that is substantially parallel to, but not collinear with, the stirrer's shaft; and (iii) said at least one member does not create substantial radial flow of the glass passing through the stir chamber.

22. The apparatus of claim 21 wherein the at least one member extends below the bottom of the stirrer's shaft.

23. The apparatus of claim 21 wherein:

(i) the stir chamber has a bottom, (ii) the side exit port is in the region of the bottom and has a vertical height h, and (iii) said at least one member has a bottom end which is spaced from the bottom of the stir chamber by a distance d, where d satisfies the relationship:

$0.2h \leq d \leq 0.7h.$

24. The apparatus of claim 23 wherein d≈0.4h.

25. A method for homogenizing molten glass comprising:

(a) providing a cylindrically-shaped, substantially vertically-oriented stir chamber which comprises a wall having an internal diameter $D_{wall}$;

(b) providing a stirrer within the stir chamber, said stirrer comprising a substantially vertically-oriented shaft and a plurality of blades which extend outward from the shaft towards the wall of the stir chamber, the maximum diameter of the blades being $D_{blade}$;

(c) flowing molten glass through the stir chamber, said molten glass having a viscosity μ; and (d) applying a torque T to the shaft of the stirrer to rotate the stirrer within the stir chamber at a speed N as the molten glass flows through the chamber, said rotation of the stirrer within the chamber defining a swept volume V;

wherein:

(i) the glass is a liquid crystal display glass;

(ii) the stirrer and the stir chamber wall each comprise platinum or a platinum alloy;

(iii) the molten glass flows through the stir chamber at a rate of at least 0.05 kilograms/second; and (iv) $D_{blade}$ in combination with N. T. V. $D_{wall}$ and μ are selected based on glass flow rate, stirring effectiveness, and sheer stress acting on the stirrer and the stir chamber wall so that when the molten glass flows through the stir chamber at said rate of at least 0.05 kilograms/second, the finished glass has a level of cord which is sufficiently low to permit the glass to be used as a glass substrate for a liquid crystal display, and the number of platinum-containing inclusions in the finished glass of a size greater than 10 microns is less than 20 per kilogram of finished glass.

* * * * *

UNITED STATES PATENT AND TRADEMARK OFFICE
CERTIFICATE OF CORRECTION

PATENT NO. : 7,127,919 B2  Page 1 of 1
APPLICATION NO. : 10/302661
DATED : October 31, 2006
INVENTOR(S) : Martin H. Goller et al.

It is certified that error appears in the above-identified patent and that said Letters Patent is hereby corrected as shown below:

| Col. | Line | |
|---|---|---|
| 12 | 21 | reads "(iv) $D_{blade}$ in combination with N. T. V. $D_{wall}$ and $\mu$ are" should read --(iv) $D_{blade}$ in combination with N, T, V, $D_{wall}$ and $\mu$ are--. |

Signed and Sealed this

Second Day of January, 2007

JON W. DUDAS
*Director of the United States Patent and Trademark Office*